United States Patent [19]

Dutil et al.

[11] Patent Number: 4,598,920
[45] Date of Patent: Jul. 8, 1986

[54] AUTOMATIC TRANSMISSION FOR A BICYCLE AND THE LIKE-PEDALED APPARATUS

[76] Inventors: Robert Dutil, 10537 Boul. Lacroix, St. Georges, Beauce-Sud, P. Q., Canada, G5Y-1K2; Raymond Gilbert, Rang Des Pepins, La Guadeloupe, Beauce-Sud, P. Q., Canada, G0M-1G0

[21] Appl. No.: 637,788

[22] Filed: Aug. 6, 1984

[51] Int. Cl.$^4$ .............. B62M 9/06; F16H 55/30
[52] U.S. Cl. ................................. 280/236; 280/261; 474/50
[58] Field of Search .............. 280/236, 238, 259, 260, 280/261; 474/49, 50

[56] References Cited

U.S. PATENT DOCUMENTS

| | | | |
|---|---|---|---|
| 3,938,403 | 2/1976 | Donaldson | 280/236 |
| 3,956,944 | 5/1976 | Tompkins | 474/50 |
| 3,969,948 | 7/1976 | Pipanhagen | 280/236 |
| 4,099,737 | 7/1978 | Waugh | 280/261 |

Primary Examiner—Joseph F. Peters, Jr.
Assistant Examiner—Donn McGieham
Attorney, Agent, or Firm—Murray, Whisenhunt and Ferguson

[57] ABSTRACT

An automatic transmission for a bicycle comprising a sprocket wheel of variable diameter, for receivably engaging a linked bicycle chain, drivingly connected to a bicycle wheel. The diameter of the sprocket wheel can be varied in relation to the angular speed of the bicycle wheel. Variation in the diameter of the sprocket in response to drive pressure applied by the linked bicycle chain is prevented by a locking mechanism.

30 Claims, 28 Drawing Figures

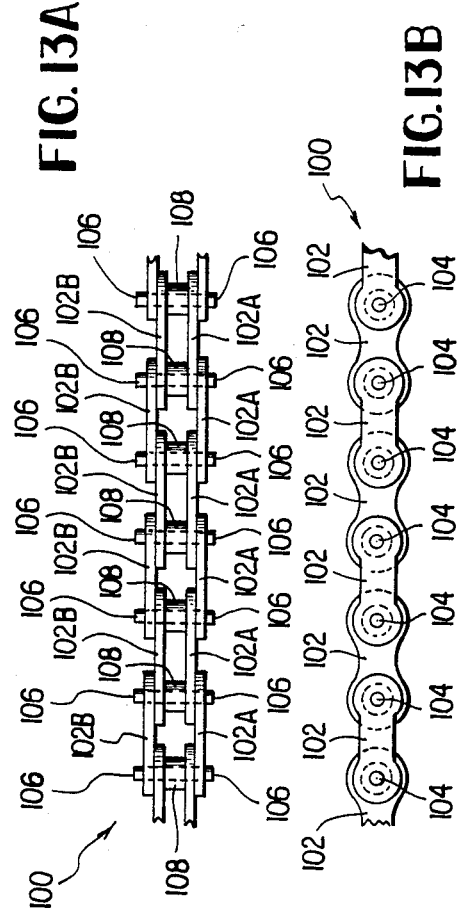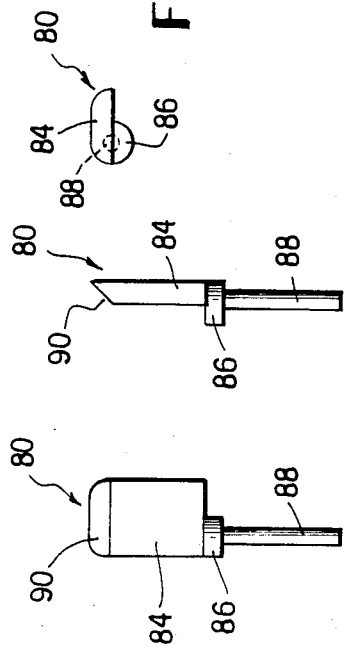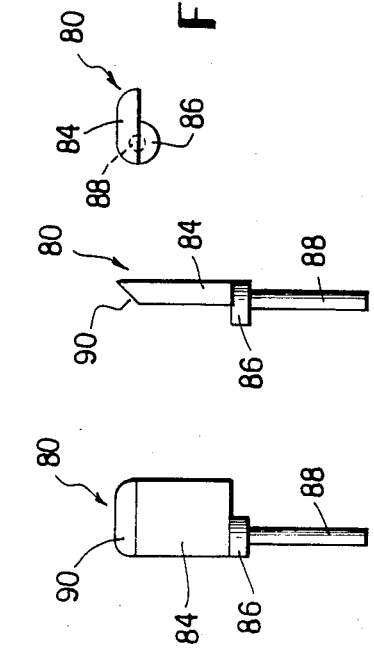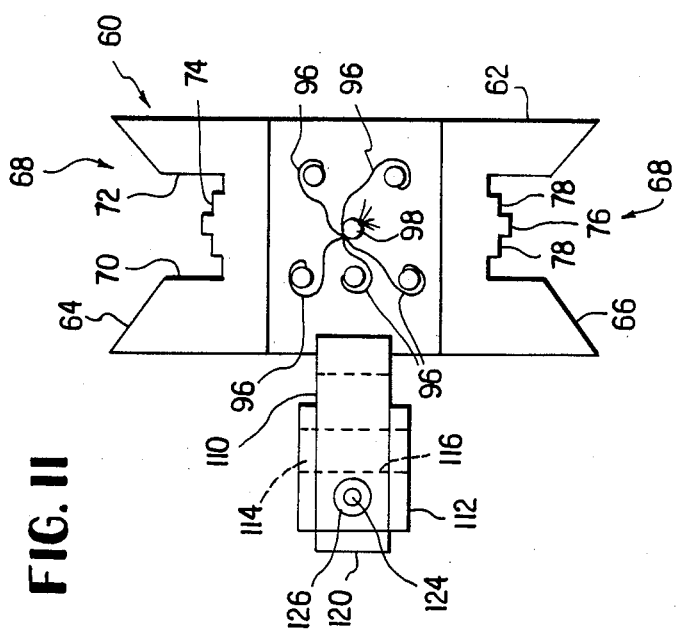

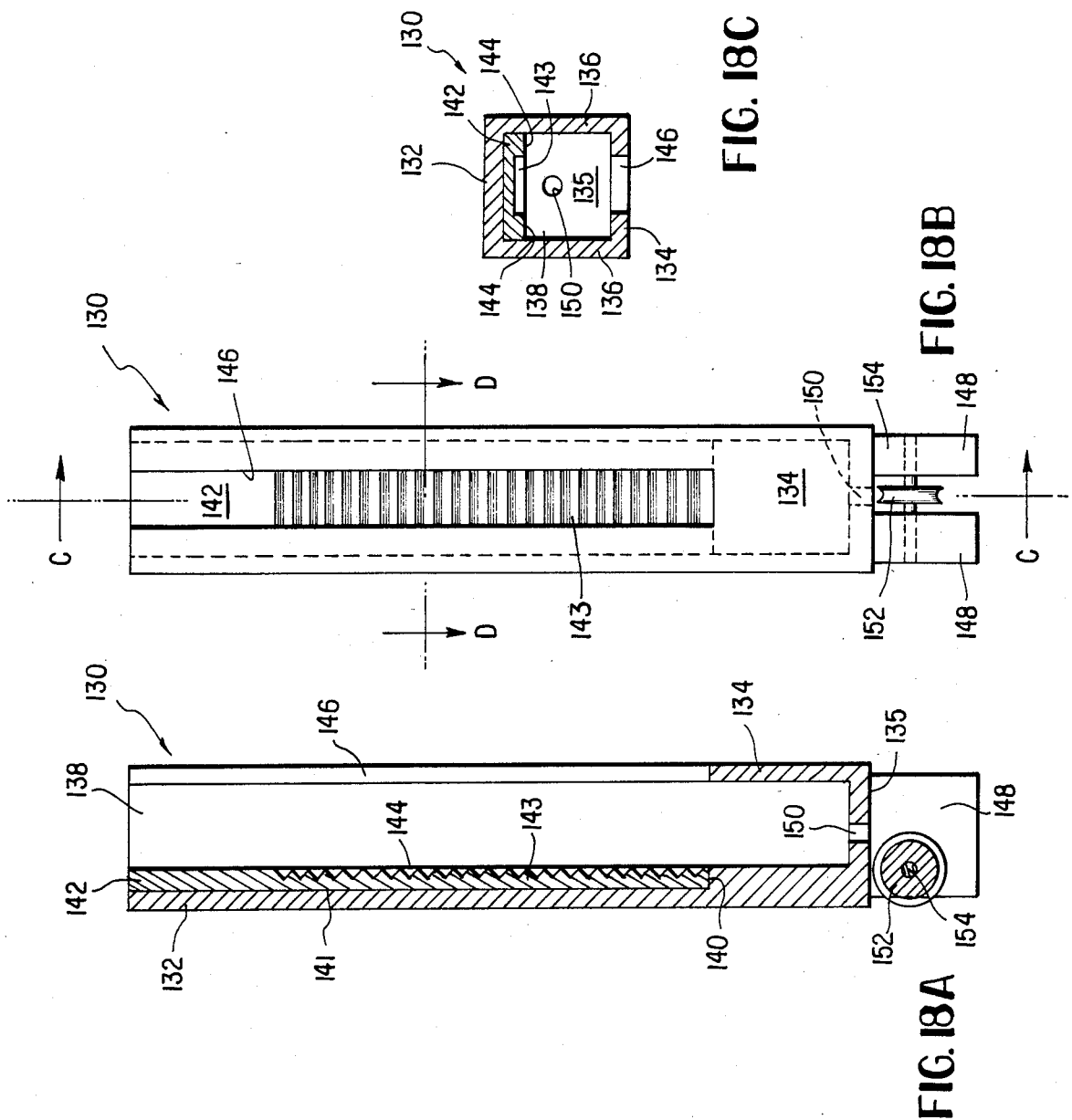

AUTOMATIC TRANSMISSION FOR A BICYCLE AND THE LIKE-PEDALED APPARATUS

BACKGROUND OF THE INVENTION

1. Field of the Invention

The present invention relates to an automatic transmission for a chain-driven rotating wheel. In particular, the invention relates to a linked chain-driven wheel where the ratio of the linear speed of the chain to the angular speed of the wheel about the hub thereof is automatically and substantially continuously adjusted. The invention finds particular application in the provision of an automatic transmission for a bicycle and like-pedaled apparatus.

2. Background of the Invention

In recent years, bicycling has enjoyed a great revival of interest. This revival has been due to an increased emphasis on exercise and physical well-being, as well as environmental considerations such as pollution problems from internal combustion exhausts and economic considerations such as the increasing expense of alternate means of transportation. This has caused bicycles to be used in a variety of riding conditions, in towns and cities and in the country, and for recreation or commutation. Due to the wide variability of bicycle uses, multispeed bicycles, particularly 10speed bicycles, have come into wide-spread use. These bicycles provide means for varying the transmission ratio between the pedaled sprocket and the rear wheel of the bicycle, the ratio being adjusted in discrete increments by the rider in accordance with speed and/or grade of terrain. The conventional transmission changing mechanism on 5- and 10-speed bicycles is the so-called "derailleur" mechanism. The "derailleur" utilizes multiple side-by-side sprockets of different diameters and rider- controlled levers to shift the bicycle drive chain from one sprocket to another of greater or lesser diameter.

The "derailleur" is subject to a number of well-known problems. The chain jumping from sprocket to sprocket can "hang up". The lateral displacement of the chain between its front and rear sprockets, in certain gears, increases the frictional force exerted on the chain and sprockets, making pedaling difficult and increasing wear on the parts of the mechanism. Moreover, shifting is limited to discrete incremental changes in ratio since all of the sprockets are of fixed diameter.

Many attempts have been made to provide automatic and/or continuously variable transmissions for bicycles.

Hayot, U.S. Pat. No. 2,584,447, discloses a variable-speed chain driving device comprising a hub mounted on the pedal shaft of a bicycle, the hub having mounted thereon flexible arms which carry at their extremities sprocket rollers which drive the chain of the bicycle. With increasing tension of the chain, due to increasing resistance offered by the rear wheel, e.g. cycling uphill, the flexible arms tend to wrap around the hub to decrease the effective diameter of the drive sprocket defined by the sprockets mounted on the arms, thereby reducing the transmission ratio to a fixed diameter sprocket driving the rear wheel. Thus, the transmission ratio is varied continuously and automatically in response to varying rear wheel resistance.

Hunt, U.S. Pat. No. 3,798,989, discloses a manually-adjustable, multiple-speed variable transmission for a bicycle wherein the front and/or rear drive sprockets can be incrementally varied in diameter by the operator.

Chao, U.S. Pat. No. 3,837,234, discloses a bicycle with a manually-operated stepless transmission wherein the rider can manually change the depth of groove between a pair of V sheaves, which define a V-belt pulley, the V-belt transmitting force to the rear wheel of the bicycle.

Tompkins, U.S. Pat. No. 3,956,944, discloses a torque operated, variable diameter, belt sheave or chain sprocket wherein a variable diameter drive wheel is formed by sheave or sprocket elements carried between two pairs of discs. If one pair of discs rotates with respect to the other pair, as a result of a change in torque force, the sheave or sprocket elements move radially inward or outward to vary the diameter of the drive wheel. Additionally, this patent discloses a free-wheel mechanism which allows a rider to "coast" on the bicycle. In particular, a plurality of individual teeth define the diameter of a drive sprocket for a bicycle. Each of these teeth is carried by a carrier, in which the tooth is slidable. If the tooth is contacted by the bicycle chain on its rearward surface, the tooth will engage the chain and transmit drive pressure. However, if the tooth is contacted by the chain on its forward or upper surface, the tooth will be depressed into the carrier for the tooth and allow the chain to slide over the tooth.

Pipenhagen, Jr., U.S. Pat. No. 3,969,948, discloses an automatically variable speed ratio transmission for a bicycle, comprising a pedal-operated drive sprocket of variable diameter formed from a plurality of small sprockets mounted on bell-crank arms. The diameter of the so-formed sprocket being variable with the resistance to pedaling.

Leonard, U.S. Pat. No. 4,030,373, discloses a variable speed drive for a bicycle comprising a variable diameter drive mechanism formed by a mounting plate having a number of radial tracks therein, and a number of sheave elements are each movably mounted in the tracks. The rider can manually cause the elements to move in the tracks to vary the diameter of the sheave pulley formed by the elements.

Porter, U.S. Pat. No. 4,119,326, discloses a variable speed bicycle wherein the bicycle is driven by a set of variable diameter pulleys. In particular, each pulley is a V-belt pulley formed of two halves, the spacing between the halves defining the diameter at which a V-belt of fixed width will ride in the pulley. The spacing of the pulley halves is manually adjusted by the rider.

Williams, U.S. Pat. No. 4,342,559, discloses a drive system useful for a bicycle comprising a load-responsive variable diameter pulley. The variable diameter pulley is formed of a fixed plate and a movable plate, each plate is provided with slots and belt engaging elements ride between the plates and engage respective pairs of slots. As the load on the drive belt varies, the plates rotate with respect to each other and cause radial movement of the belt engaging elements, thereby varying the diameter of the pulley.

In addition to load-operated and manually adjustable transmissions, attempts have been made to produce transmissions responsive to speed of rotation.

Hohne, U.S. Pat. No. 904,330, discloses a driven shaft having a hub mounted thereon. This hub comprises a number of fixed spokes. The spokes have U-shaped crosssections and in each fixed spoke there is slidably mounted a sliding spoke which is formed at its outer end as a sector of the periphery of a belt pulley. Springs are provided which tend to pull the sectors to maximum diameter. The sliding spoke carries a pin which is engaged by a fork. This fork is pivoted about a point and carries a weight at its end. The operation of the apparatus is such that if the speed of rotation of the shaft increases, the weights will tend to move outwards and thereby exert an inwardly directed pull on the sectors. The inward movement of the sectors diminishes the diameter of the pulley. Likewise, when the speed of rotation of the shaft decreases, the weights will move inwards, aided by the springs, and thereby increase the diameter of the pulley.

Lee, U.S. Pat. No. 3,935,751, discloses a centrifugal, stepless speed changing device comprising a plurality of claw blocks mounted pivotally on a rotating disc. The outer ends of the claw blocks defining the periphery of a drive wheel. As the speed of rotation of the disc increases, the claw blocks move outward to increase the diameter of the wheel. Likewise, when the speed of rotation of the disc decreases, the claw blocks move inward to decrease the diameter of the wheel.

Also, many attempts have been made to produce variable diameter pulleys. Typically, such variable diameter pulleys are V-belt pulleys comprised of a pair of opposed cone discs or pulley halves which cooperate with a V-belt, the variation in diameter being achieved by adjusting the axial spacing of the pulley halves which allows the V-belt to ride higher or lower in the groove between the pulley halves. Representative of such variable diameter V-belt pulleys are Tyler, U.S. Pat. No. 2,321,438; Carroll, U.S. Pat. No. 2,491,248 (disclosing a remote control linkage and idling mechanism); Ingold, U.S. Pat. No. 2,751,790 (disclosing a mechanism for simultaneous, equal and opposed movement of the pulley halves to prevent lateral movement of the belt); Wrobbel, U.S. Pat. No. 2,941,412 (a further mechanism for simultaneous, equal and opposed movement of the pulley halves); Aplin, U.S. Pat. No. 3,064,486 (a still further mechanism to assure belt alignment by achieving simultaneous, equal and opposite movement of the pulley halves); Schaufler, U.S. Pat. No. 3,115,045 (a still further mechanism to assure belt alignment with diameter variation) and Looker, U.S. Pat. No. 3,269,201 (a mechanism designed to prevent intrusion of dirt into and to preclude loss of lubricant from the pulley).

As may be readily ascertained from the abovenoted patents, the prior art is replete with attempts to provide variable speed transmissions for bicycles by utilizing pulleys (drive wheels or sprockets) of variable diameter and, more generally, to provide pulleys of variable effective diameter. These attempts suffer from numerous defects. With respect to V-belt pulleys of variable effective diameter, complicated mechanisms are necessary to ensure that the V-belt is not laterally displaced when the pulley halves are moved relative to one another to vary the effective diameter of the pulley. These mechanisms increase the cost of the pulley and make manufacture of the pulley more difficult. Without such a mechanism, the lateral displacement of the V-belt causes uneven and rapid wear of the belt during operation.

Moreover, belt-type drives for bicycles have generally been found to be inefficient and troublesome. In particular, belt drives tend to slip over the pulley when heavily loaded as when starting up on a bicycle or when traveling over a steep grade in the terrain. This slippage tendency is exacerbated in wet road conditions where water acts as a lubricant between the belt and pulley. Additionally, road dirt tends to act as an abrasive and increases the wear on the belt.

Mechanisms which solely rely on the speed of rotation of a driven shaft to vary drive wheel diameter, such as Hohne and Lee, mentioned above, fail to take into account the variability of the driven load. Thus, while a given load will allow operation of these devices as indicated, an increase in load will increase the belt tension thereby increasing the force exerted on the variable diameter wheel. This increase in force on the wheel will tend to cause it to decrease in diameter, thereby disadvantageously affecting the speed ratio. Additionally, the mechanisms of Hohne and Lee are directed to belt drives which are susceptible to the previously noted disadvantages, per se.

Attempts to adapt variable diameter wheels to bicycles, as illustrated by the above-noted patents, have been limited to torque or load-operated mechanisms or to manually adjustable systems.

A need, therefore, continues to exist for an automatic speed ratio transmission for bicycles and like-pedaled apparatus.

SUMMARY OF THE INVENTION

The present invention provides an automatic transmission for a bicycle or like-pedaled apparatus wherein the speed ratio between the driven wheel (angular speed of the wheel) and the pedaled drive sprocket (linear speed of the chain) is automatically and substantially continuously adjustable in response to the speed of rotation of the driven wheel. The transmission is automatic in the sense that no rider intervention is required for speed ratio changes, the speed ratio changing solely in relation to the speed of rotation of the driven wheel. The transmission is substantially continuously adjustable in the sense that between previously determined upper and lower speed ratios no incremental jumps limit the available ratios and any ratio can be attained and utilized.

BRIEF DESCRIPTION OF THE DRAWINGS

FIG. 11 is a bottom view of the preferred chain engaging mechanism according to the present invention.

FIGS. 12A, 12B and 12C are front, side and top views, respectively, of a chain engaging lever according to the present invention.

FIGS. 13A and 13B are top and side views, respectively, of a modified bicycle chain utilizable in accordance with the present invention.

FIG. 17 illustrates a chain engaging mechanism according to the present invention.

FIGS. 18A, 18B and 18C are a front view and two sectional views, respectively, of a preferred guide member assembly according to the present invention, FIG. 18A being a sectional view along line CC of FIG. 18B, and FIG. 18C being a sectional view along line DD of FIG. 18B.

DETAILED DESCRIPTION OF THE PREFERRED EMBODIMENTS

The present invention provides an automatic transmission for a bicycle or like-pedaled apparatus. The automatic transmission for a linked chain driven spoke and hub wheel comprises a plurality of engaging means displaced about the hub and, together, defining a sprocket of variable diameter for receivably engaging said linked chain; sprocket varying means, operably connected to said engaging means, for varying the radial position of said engaging means, and hence, the diameter of said sprocket, in relation to the angular speed of said wheel; connecting means for connecting the said sprocket varying means to said hub; and locking means for substantially locking that portion of the engaging means of the said sprocket which are being engaged by said chain; whereby an angular rotation of said wheel those engaging means engaged by said chain are locked into a drive position for transmission of power to said wheel and those engaging means not engaged by said chain are free to by radially moved by said sprocket varying means to automatically and substantially continuously establish a different sprocket diameter in relation to the angular speed of the wheel.

Figure 1A:
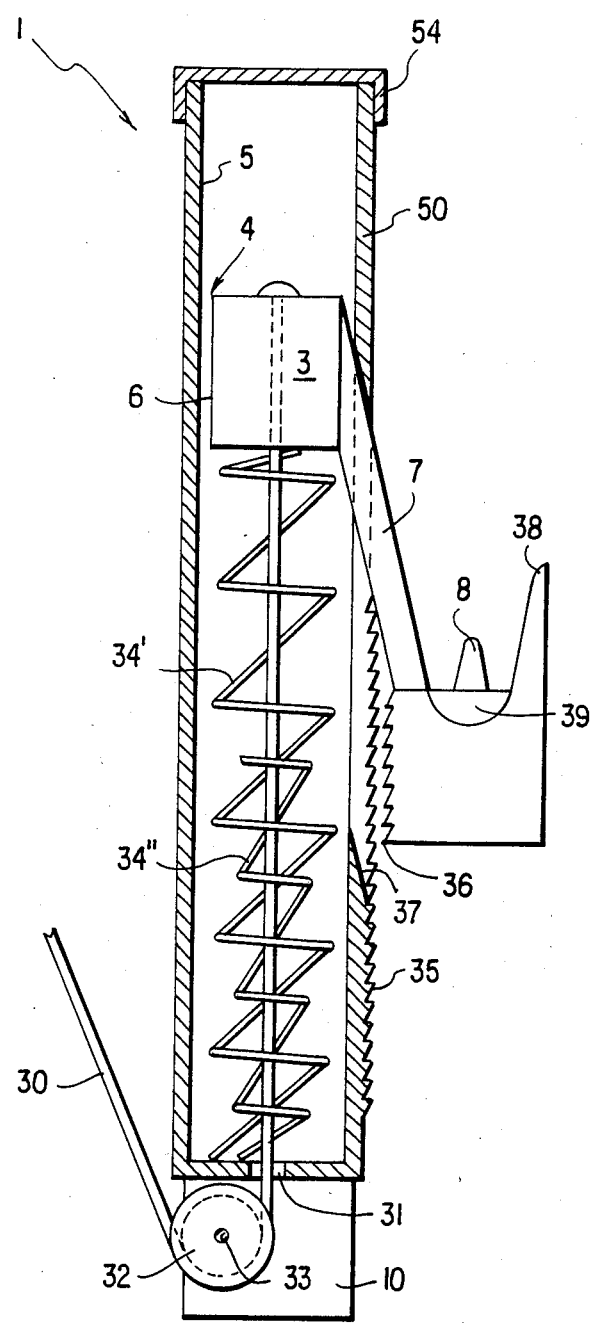
FIGS. 1A and 1B illustrate a guide member according to the present invention, FIG. 1A being a sectional view of the guide member along line AA in FIG. 1B.
Figure 1B:
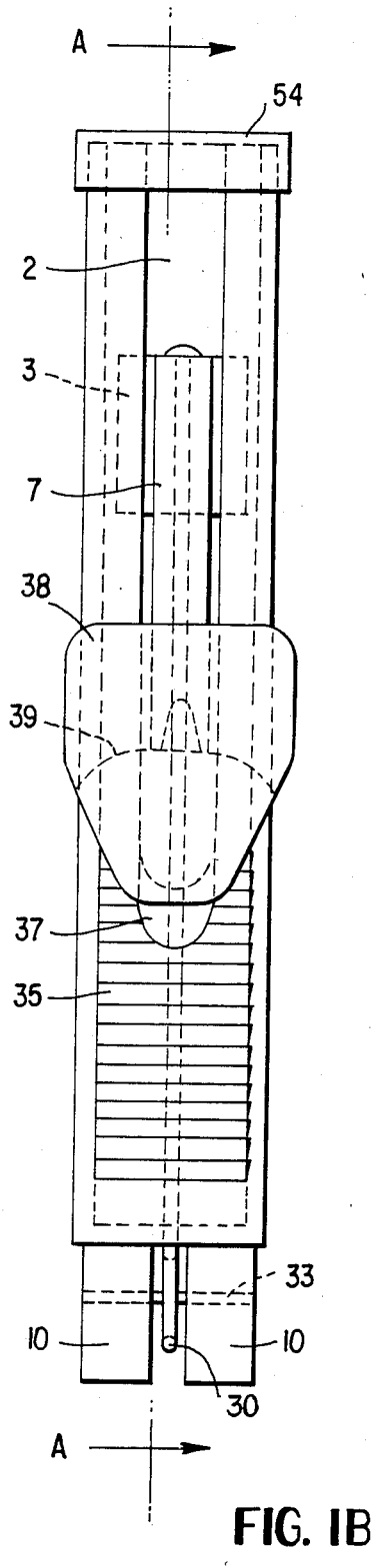

The sprocket varying means comprises a plurality of guide members radially mounted on a hub. Details of the construction of such a guide member are shown in FIGS. 1A and 1B. Each guide member indicated generally as 1 comprises a hollow cylinder 50 having a slot 2, preferably, over substantially its entire length. A cylindrical plug 3 is disposed within the hollow cylinder, the plug being movable along the axis of the cylinder. A cap 54 is provided and this cap is usually removable to allow easy assembly and periodic maintenance. Sufficient clearance 4 between the interior wall 5 of the cylinder 50 and the circumference 6 of the cylindrical plug 3 is provided to allow the plug to be canted within the cylinder. A following arm 7 is mounted on plug 3 and extends outwardly and toward the axis of hub 9 through slot 2 provided in the hollow cylinder 50. Means for drivingly engaging a linked drive chain are mounted on the free end of the following arm. In the illustrated embodiment, this comprises a single gear tooth 8 which will engage a conventional linked bicycle chain.

Figure 2:
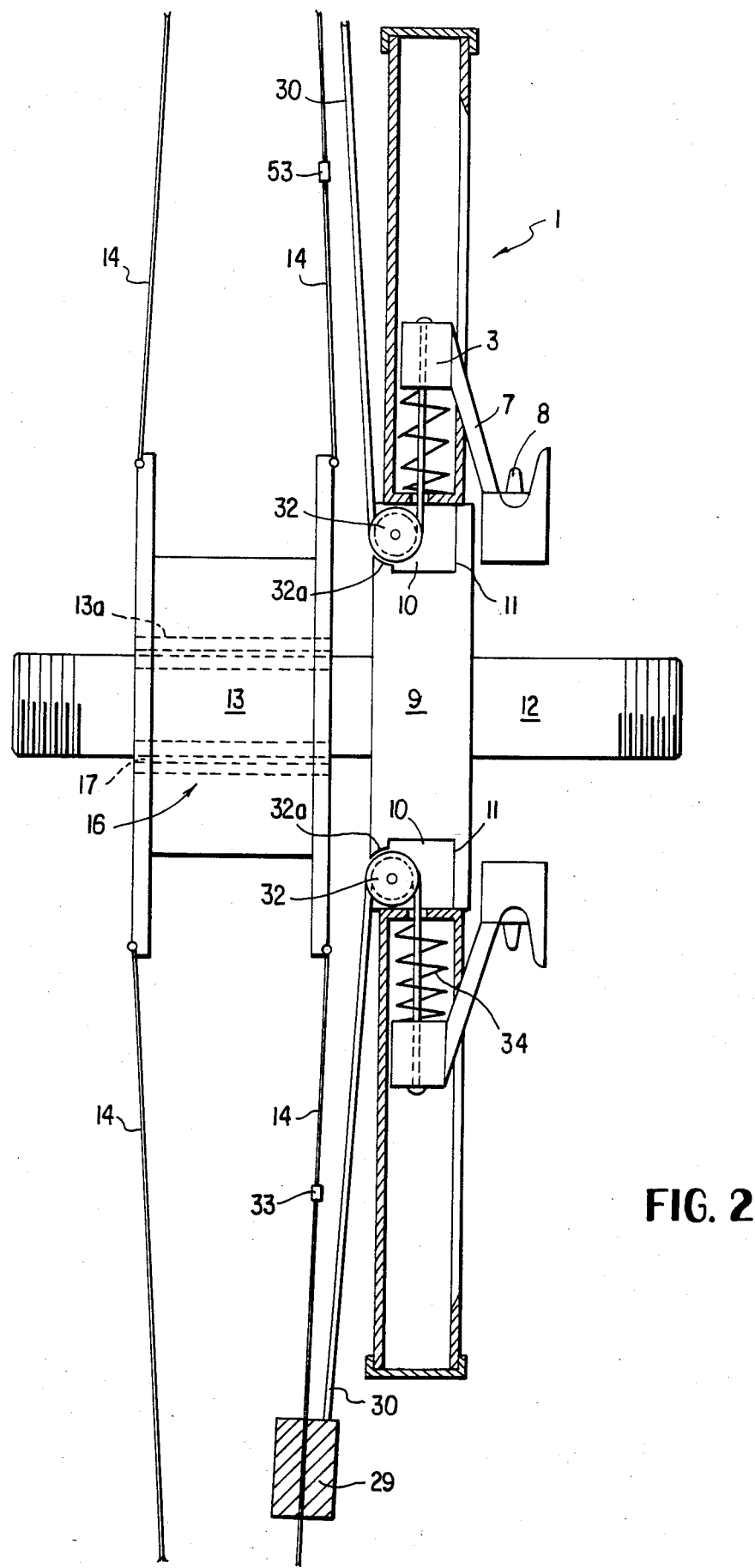
FIG. 2 illustrates the guide members mounted on the drive shaft of a bicycle wheel.
Figure 3:
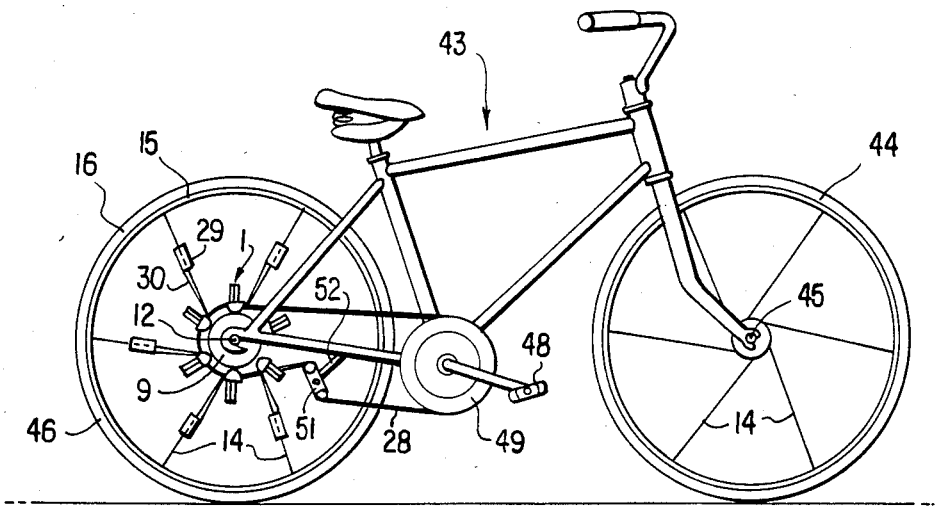
FIG. 3 illustrates a bicycle provided with the automatic transmission of the present invention.

As previously noted, a plurality of these hollow cylinders are mounted radially on a hub 9 (shown in FIG. 2) and define the rear drive sprocket of a bicycle (as best seen in FIG. 3). Mounting of the cylinder assemblies 1 on the hub 9 can be achieved by providing a pair of legs 10 at the base of the hollow cylinder 50, these legs fitting into sockets 11 (see FIG. 2) provided radially around the periphery of hub 9. The rear drive sprocket, defined by the hub 9 and the cylinder assemblies 1, is mounted on the shaft 12 of the rear wheel of a bicycle comprising rear wheel hub 13, a plurality of spokes 14, tire rim 15 (see FIG. 3) and tire tread 16 (see FIG. 3).

Figure 5:
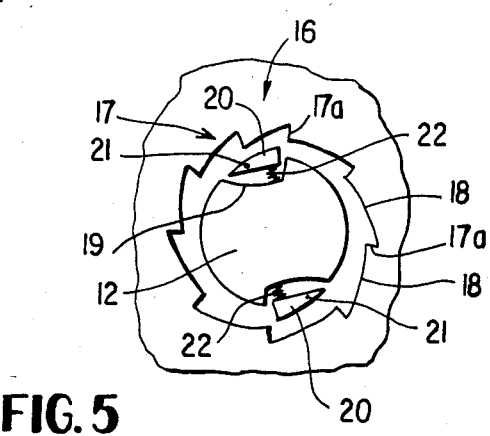
FIG. 5 illustrates another free-wheel mechanism useful in the present invention.

In order to provide motive power to the rear wheel of the bicycle, means for connecting the drive sprocket, as defined above, to the rear bicycle wheel are provided. In its simplest form, both the hub 9 and the rear wheel hub 13 are rigidly attached to shaft 12. However, such an arrangement requires continuous pedal movement when the bike is in motion. In order to allow "coasting" (movement of the bicycle without pedal motion as when going down-hill with gravity providing the motive force) a "free-wheel" mechanism 16 is provided (see FIG. 5). Thus, the hub 9 can be rigidly attached to shaft 12, but means are provided for lockingly engaging the rear bicycle wheel and shaft 12 when the shaft is rotated, relative to bore hole 13a in a first direction and for slidingly engaging the rear bicycle wheel and the shaft when the shaft is rotated in the opposite direction, relative to bore hole 13a. The "free-wheel" mechanism 16 (shown in side view in FIG. 5) comprises a bore hole 13a through rear wheel hub 13 (see FIG. 2) having a serrated surface 17 providing flat abutments 17a radially spaced about bore hole 13a connected by gradually sloping bore wall portions 18 (see FIG. 5). The shaft 12 is provided with grooves 19 which contain shims 20 which are pivotally attached to the shaft at one end 21 and biased away from the shaft at the other end by spring 22. When the rotation of shaft 12 relative to bore hole 13a is clockwise (in reference to FIG. 5), the end of the shim 20 which is biased away from the shaft 12 comes into contact with a flat abutment 17a thereby lockingly engaging the rear wheel hub 13 and transmitting force to the same. When the rotation of shaft 12 within the bore 13a is counter-clockwise (in reference to FIG. 5), the end of the shim 20 which is biased away from the shaft is forced into groove 19 by the sloping bore wall portions 18 thereby allowing the rear wheel hub 13 to slide over the shaft 12.

Figure 4A:
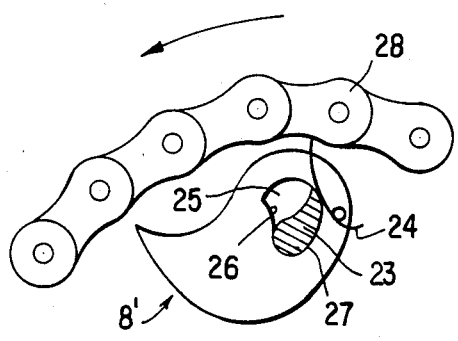
FIGS. 4A and 4B illustrate a free-wheel mechanism according to the present invention.
Figure 4B:
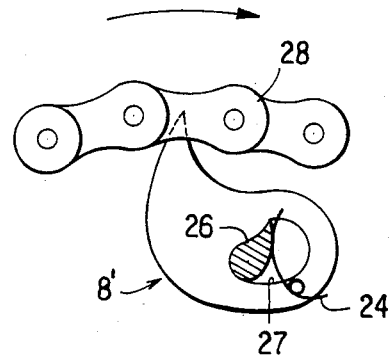

Alternatively, the "free-wheel" mechanism can be used to attach hub 9 to shaft 12 and rear wheel hub 13 can be rigidly attached to shaft 12. As an additional alternative, both hub 9 and rear wheel hub 13 can be rigidly attached to shaft 12 and the "free-wheel" mechanism incorporated in the chain engaging mechanism mounted on the free end of the following arm 7. In this embodiment, at least one gear tooth 8' (see FIGS. 4A and 4B) having a generally tear-drop cross-section is pivotally mounted on a shaft 23, also of generally tear-drop cross-section, but oriented reverse to that of the tooth. A spring 24 biases the tooth to retain an upright position. A bore 25 through tooth 8' for receiving shaft 23 has a generally kidney bean cross-section providing a front abutment 26 and a rear abutment 27 limiting the degree of rotation of tooth 8' about shaft 23. As shown in FIG. 4 A, when the bicycle chain 28 moves counter-clockwise with respect to the tooth 8', the tooth will rotate until stopped by rear abutment 27 and disengage from the links of the chain allowing the chain to slide over the tooth. When the chain moves clockwise with respect to the tooth, as shown in FIG. 4B, the spring 24 will bias the tooth into an upright position until stopped by front abutment 26 and the tooth will engage the links of the drive chain and transmit force to the shaft 23.

Of course, a plurality of pivotable teeth can be utilized, wherein the teeth are aligned in the direction of chain travel. This alignment can be utilized to alleviate "chain shock" caused by slippage of the chain prior to engagement with the teeth. For example, with one tooth, if the tooth from time-to-time comes into alignment with a chain rivet, the tooth will slip into engagement with the next following rivet of the bicycle chain, i.e. it will slip a distance equal to the rivet spacing before engaging. The "shock" created by this slip will be clearly felt by the rider. By utilizing a plurality of teeth, each tooth spaced from adjacent teeth by a distance less than the rivet spacing, this "chain shock" is alleviated by reducing the distance a given tooth will slip before engaging a chain rivet. In particular, the "slip" distance will be equal to the rivet spacing divided by the number of teeth provided. The more teeth utilized in each chain engaging mechanism, the less the slip. Preferably, 3-5 teeth can be utilized.

It should be noted that as shown in FIG. 2 (for ease of representation), if the "free wheel" mechanism is provided in hub 9 or rear wheel hub 13, relative rotation between hub 9 and rear wheel hub 13 can occur. If this does occur, then cables 30 can wrap about shaft 12. Thus, if the weights 29 are attached to the rear wheel, the "free wheel" mechanism must be incorporated in the chain engaging mechanism. However, as discussed hereinafter with respect to FIG. 16, the "free wheel" mechanism can be incorporated in hub 9 or rear wheel hub 13 when weights 29 are slideably mounted on elements of the transmission.

The diameter of the sprocket wheel is varied in substantially inverse proportion to the speed of rotation of said bicycle wheel by utilizing centrifugal force generating means comprising a plurality of weights 29 (see FIGS. 2 and 3) each of which is slidably mounted on a respective spoke 14 of the bicycle wheel. Each weight 29 is connected by a flexible cable 30 to a respective plug 3 in hollow cylinder 50. The cables are each threaded through a hole 31 (see FIG. 1A) in the bottom of hollow cylinder 50 and pass over a pulley 32 mounted on an axle 33 between legs 10 at the base of cylinder 50. A corresponding slot 32a (see FIG. 2) is provided in hub 9 to permit passage of the cable 30 to weight 29. A detent 53 may be provided on spoke 14 to prevent the weight from falling to wheel hub 13, when the bicycle is stopped and plug 3 is at its greatest outward position. This prevents slack cables from fouling.

The plug 3 is biased away from the hub 9 by way of a spring 34 mounted within the hollow cylinder 50 between the plug and the base of the hollow cylinder 50. Flexible cable 30 passes through the axis of spring 34. The spring 34 allows the transmission to alter the diameter of the variable diameter sprocket wheel in substantially inverse proportion to the speed of rotation of the bicycle wheel (i.e. the speed of the bicycle).

As is well-known, the centrifugal force exerted on a body rotating in a circle is given by the equation:

$$F_c = (m\ v^2)/r$$

where:
$F_c$ = centrifugal force
m = mass of the body
v = velocity
r = radius of path of rotation.

Figure 7A:
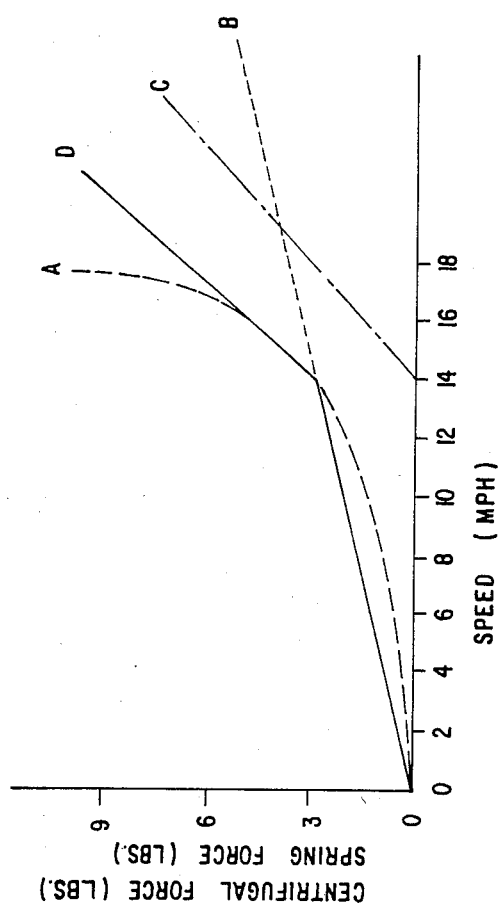
FIGS. 7A and 7B depict graphs of centrifugal force as a function of bicycle speed upon which are superposed spring biasing forces according to the present invention.

As the velocity increases, the force on the body increases with the square of the velocity. If plug 3 is not biased by spring 34, a point is rapidly reached where the centrifugal force on the rotating weight 29 overcomes any frictional forces in the system and causes the plug to move toward the hub 9 without restraint. Thus, as soon as any frictional forces were overcome the variable diameter sprocket would collapse to its minimum diameter. Spring 34 prevents this collapse by exerting a counter force against the pull of the cable 30. As shown in FIG. 7A, the centrifugal force on the weight (Curve A) varies exponentially with speed, while the resistive force of spring 34 (Curve B) varies linearly as it is compressed. The two curves can be varied by altering the allowable radial positions of weight 29 (i.e. shortening or lengthening cable 30), altering the mass of the weight 29, and altering the strength of the spring.

Figure 7B:
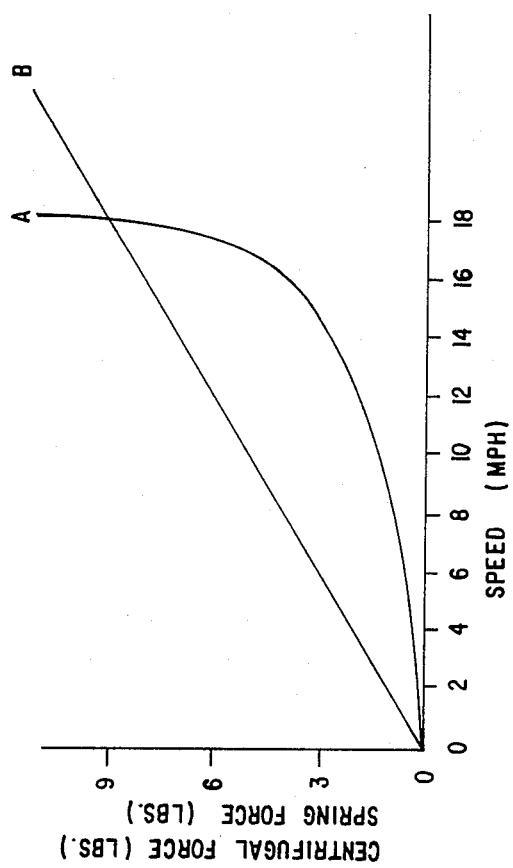

In an alternate embodiment of the invention (shown in FIG. 1A), two springs 34' and 34" are provided within hollow cylinder 50. Spring 34', when normally extended, will hold plug 3 at its furthest position from hub 9. Spring 34' closely follows the periphery of the interior wall 5 of cylinder 50. Spring 34", when normally extended, is of shorter length than spring 34' and is in close proximity to cable 30. The result of the provision of these two springs can readily be seen in FIG. 7B. Curve A represents the centrifugal force exerted on weight 29 as it rotates with the bicycle wheel. Curve B represents the force exerted by spring 34' as it is compressed by the movement of plug 3. Curve C represents the force exerted by spring 34" as it is compressed by the movement of plug 3. (However, since spring 34" is shorter than spring 34', it only begins to be compressed after the plug 3 has moved a predetermined distance within the cylinder 50.) Curve D represents the sum of the forces exerted by the springs 34' and 34". Thus, two linear springs can be used to closely parallel the exponential curve of centrifugal force. Accordingly, by providing one or more springs, the movement of plug 3 in response to the centrifugal force on weight 29 can be set to be substantially in inverse proportion to the speed of rotation of the bicycle wheel (i.e. the speed of the bicycle). In turn, the position of plug 3 determines the diameter of the sprocket wheel.

Locking means are also provided for substantially preventing variation in the diameter of the sprocket wheel in response to drive pressure applied by the drive chain. Such means comprise a first frictional surface associated with the hollow cylinder 50. This frictional surface may be on interior wall 5, or on the outer surface of the hollow cylinder 50 adjacent to the slot 2, as shown in FIG. 1A. A second frictional surface is provided on following arm 7 facing said first frictional surface. The first and second frictional surfaces cooperating to substantially prevent movement of the cylindrical plug 3 when brought into contact by drive pressure applied to the following arm by the drive chain. In the embodiment illustrated in FIG. 1A, the surface of hollow cylinder 50, adjacent to slot 2, is cut to form serrations 35 (also partially shown in FIG. 1B). The surface of the following arm 7, facing the serrations 35 on the cylinder 50, is also cut to form serrations 36. When pressure is applied on the following arm 7, by the drive chain engaged on tooth 8, the arm will cant toward cylinder 50, since plug 3 will be canted within cylinder 50. This will bring serrations 35 and 36 into contact and lock the following arm into position on the cylinder surface. When pressure is released, the serrations 35 and 36 will disengage due to centrifugal force and the pressure of spring 34' on the base of the plug 3, which will tend to level plug 3 within the cylinder 50. It will also be appreciated that this same serration arrangement may be made between plug 3 and interior wall 5.

A shoulder 37, at the base of the slot 2 in cylinder 50, which parallels the slope of following arm 7, allows the retention of a minimal diameter of the sprocket at very high speeds.

A chain guard 38, comprising a flange assists in keeping the bicycle chain on tooth 8, and prevents loss of chain contact when the tooth fails to align properly with the chain links as will happen from time-to-time (since the number of links in the chain is fixed and the tooth spacing is variable as the sprocket changes diameter).

A champfer 39 can also be provided on the free end of the following arm 7. The champfer parallels and underlies the path of chain travel so as to aid in maintaining engagement of the tooth and the linked chain.

Figure 6A:
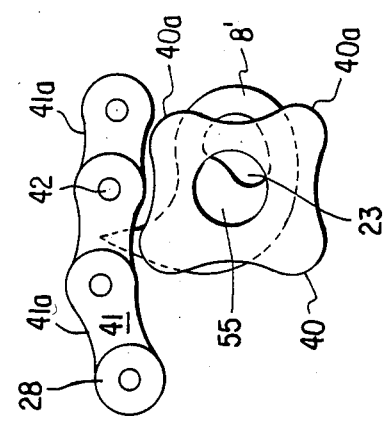
FIGS. 6A and 6B illustrate a chain engaging mechanism according to the present invention.
Figure 6B:
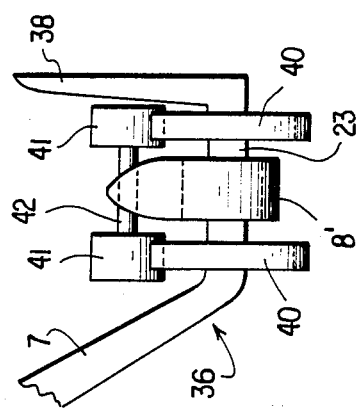

Alternatively, the free end of the following arm 7 can be fitted with two bearings 40 (see FIGS. 6A and 6B), for supporting the bicycle chain 41, each preferably having four lobes 40a which conform to the, normally, substantially sinusoidal configuration of a bicycle chain formed by links 41a held together by rivets 42. In this instance each bearing 40, rides on a bearing carrier 55 to allow free rotation about the tear-drop shaped shaft 23.

FIG. 3 illustrates a bicycle utilizing the present invention. In particular, the bicycle comprises a supporting frame (indicated generally as 43), a front ground-engaging wheel 44 mounted on an axle 45 which is mounted on the supporting frame, a rear ground-engaging wheel 46 drivingly mounted on a first shaft 12 which is journally mounted on the supporting frame, a second shaft 47 journally mounted on the supporting frame at substantially the fore and aft center of the frame between the front and rear wheels, foot-driven pedals 48 mounted on opposite ends of the second shaft 47, a drive sprocket 49 fixedly mounted on the second shaft, said drive sprocket 49 located adjacent to frame 43 and inwardly of said pedal 48 on that end of second shaft 47, and an endless chain loop comprising a conventional bicycle chain 28 engaging the drive sprocket 49. The bicycle chain also engages the transmission according to the present invention comprising hub 9 mounted on shaft 12 adjacent rear wheel 46 and inboard of the supporting frame on that side of rear wheel 46. Six cylinder assemblies 1 are radially disposed about hub 9. The plug 3 in each cylinder assembly is connected by a respective cable 30 to a respective weight 29 mounted slidably on a respective spoke 14 of the rear wheel. (Spokes 14 on both the front and rear wheels have only been partially illustrated for clarity of representation.) The bicycle chain engages chain engaging means provided on following arms 7 attached to plug 3 within each cylinder assembly 1, and force placed on the chain engaging means by bicycle chain 28 causes rear wheel 46 to rotate and drive the bicycle forward.

In operation, as the speed of the bicycle increases, i.e. the wheels rotate faster, the centrifugal force on weight 29 increases and causes the weight to move outwardly. This causes cable 30 to pull plug 3 inwardly thereby decreasing the diameter of the drive sprocket defined by the six cylinder assemblies 1 and producing a more favorable speed ratio between the rear drive sprocket and drive sprocket 49.

As the rear drive sprocket, defined by the six cylinder assemblies 1, rotates forwardly with increasing speed, the cylinder assemblies 1 will, in turn, disengage from the chain. It will be appreciated that when the cylinder assemblies 1 are disengaged from the chain, there is no force on the chain engaging means, and hence, on following arm 7 (see FIG. 2). Thus, plug 3 will not be canted in hollow cylinder 50 and, consequently serrated surfaces 35 and 36 will be unlocked (see FIG. 1A). With serrated surfaces 35 and 36 being unlocked, weight 29 will be free to move outwardly, and, through cable 30, repositions plug 3 in a "new" smaller sprocket diameter. Thus, while each cylinder assembly 1 is not engaged by the chain, each, in turn, is free to automatically establish a "new" smaller sprocket diameter in proportion to the increased speed of the rear wheel, i.e. the cylindrical assemblies 1 are free to adjust in diameter responsive to the additional centrifugal force on weight 29. When each cylinder assembly, in turn, re-engages the chain, it will be locked in place at the previously adjusted diameter by virtue of the contact between serrated surfaces 35 and 36 (see FIG. 1A) brought about by the force applied to following arm 7 by chain 28. Likewise, when the cylindrical assemblies 1 are not engaged by the chain 28 and the speed of the bicycle decreases, the centrifugal force on weight 29 decreases and in response to the biasing force applied to plug 3 by the spring or springs in cylinder 50, the plug 3 will move outwardly, thusly, increasing the diameter of the rear drive sprocket defined by the six cylinder assemblies 1, and causing cable 30 to draw weight 29 inwardly.

In order to assure chain engagement with both drive sprocket 49 and the rear drive sprocket, a conventional bicycle chain tensioning device 51 (see FIG. 3) may be mounted on the supporting frame by bracket 52.

Six cylinder assemblies have been used in the embodiment illustrated to define the rear drive sprocket, however, more cylinder assemblies or fewer assemblies may be used as is within the skill of the artisan.

FIGS. 8, 9, 10 and 11 illustrate a particularly preferred form of the chain engaging mechanism. In particular, the chain engaging mechanism, generally indicated as 60, comprises an engagement body 62 having a first end 64 and a second end 66. A longitudinal groove 68 is formed in the engagement body 62 and extends from the first end 64 to the second end 66. The groove has side walls, 70 and 72, and a bottom of predetermined profile. The bottom profile is symmetrical across the width of the groove and comprises a central raised portion 74 extending from one end of the engagement body to the other. The central raised portion 74 comprises a center portion 76 and shoulders 78 adjacent each side of the center portion 76. The engagement body 62 may be provided with at least one recess 80 formed in each side wall, 70 and 72. Each recess receives a lever 82 which is pivotally connected to the engagement body 62 at the end of the lever closest to the first end 64 of the engagement body.

Details of the lever construction are shown in FIGS. 12A, 12B and 12C. In particular, lever 82 comprises a lever arm 84 having a pivot base 86 and a pivot shaft 88 extending downwardly therefrom. The upper portion of the lever arm 84 may be cut to form a bevel 90 which substantially matches a bevel 92 cut in the top portion of each sidewall, 70 and 72, of the engagement body 62.

The lever 82 is pivotally connected to the engagement body 62 by passing the pivot shaft 88 through a corresponding bore 94 formed in the engagement body.

Springs 96 are connected to each pivot shaft 88 and can be anchored to a central post 98 formed in the base of the engagement body 62. These springs 96 yieldably urge the free ends of the levers 82 away from the side walls, 70 and 72, into the longitudinal groove. The shoulders 78 of the central raised portion 74 of the bottom profile of the groove act as a detent to prevent and/or limit the rotation of the lever arm 82 into the longitudinal groove 68.

Alternatively, instead of pivot shaft 88 being cylindrical and biased by spring 96, it may be of a generally rectangular cross-section (in which case bore 94 would also be of corresponding rectangular crosssection) and formed of a spring-elastic resilient material. The lever arm 84 would be canted at an appropriate angle to the rectangular pivot shaft, thereby holding the free end of the lever arm away from the side wall, but allowing the free end of the lever arm to be rotated back into the recess 80 against the spring-elastic resilience of the rectangular pivot shaft. The rectangular pivot shaft could be retained in bore 94 by use of a pin passing through the shaft or by a lock washer affixed to the end of the shaft (as may be the cylindrical pivot shaft).

Figure 8:
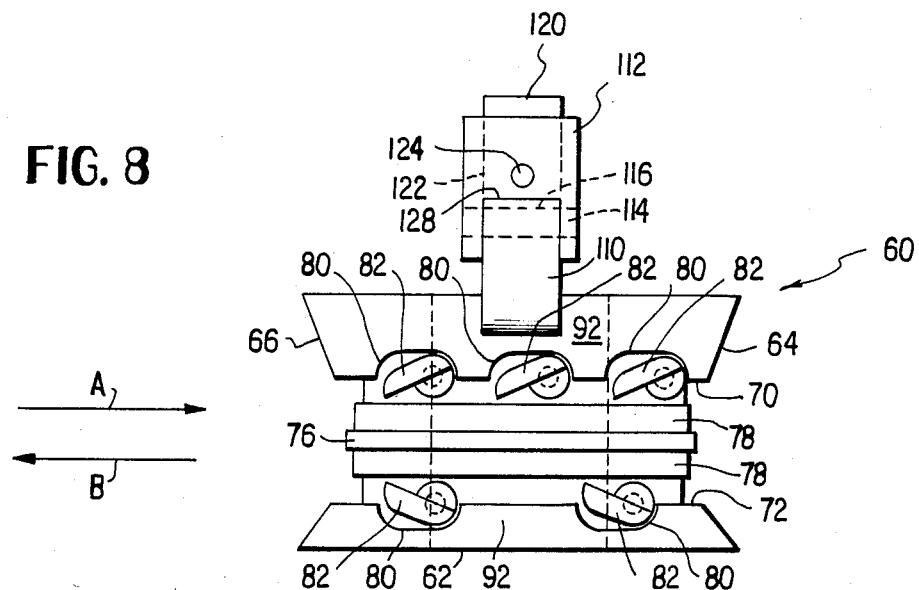
FIG. 8 is a top view of the preferred chain engaging mechanism according to the present invention.

As shown in FIG. 8, it is preferable that a plurality of levers 82 and associated recesses 80 be provided in each side wall, 70 or 72, of the longitudinal groove. Most preferably, the levers 82 and associated recesses 80 on one side wall 70 are staggered with respect to the levers 82 and associated recesses 80 with the other side wall 72.

The particularly preferred chain engaging mechanism 60 is utilized with a specially modified drive chain 100, illustrated in FIGS. 13A and 13B. The specially modified drive chain 100 is formed of a plurality of link member pairs 102 extending longitudinally and pivotally joined at their ends to adjacent link member pairs by transverse rod-like connecting members 104. Each link member pair 102 is formed of a left-hand link member 102A and a right-hand link member 102B disposed parallel to one another. Each link member, 102A or 102B, of a link member pair 102 is provided with an aperture (not shown), receivable of the transverse rod-like connecting members 104, at each end. The rod-like connecting members 104 pass through the respective apertures (not shown) at the overlapping ends of adjacent link member pairs so that the adjacent link member pairs are each pivotable about the common connecting member 104. The ends 106 of the transverse connecting members 104 can be flared or swaged or provided with lock washers (not shown) in order to retain the link members, 102A and 102B, on the transverse connecting members 104. The ends 106 of the transverse connecting members 104 extend outboard of the sides of the link members 102A and 102B, preferably at least 1/16 inch. As may be best seen in FIG. 13A, the link member pairs 102 are disposed in an alternating inboard-outboard fashion, i.e. any link member pair is disposed either inboard of adjacent link member pairs or outboard of adjacent link member pairs. Additionally, the respective link members, 102A and 102B, of a link member pair are held apart transversely by a roller bearing 108 mounted on the transverse connecting member 104 for rotation about the transverse connecting member.

In operation, the particularly preferred chain engaging element 60 (as shown for instance in FIG. 8) as it rotates will come into engagement with the drive chain 100 (as shown in FIGS. 13A and 13B). The bevel 92 formed on the upper portions of the side wall, 70 or 72, serves to aid in centering the chain 100 into groove 68. The roller bearings 108 of the chain 100 will ride on the center portion 76 of the central raised portion 74 of the bottom profile of the groove 68. Movement of the chain in the direction of the arrow marked "A" in FIG. 8 will cause at least one of the outboard extensions of the ends 106 of the transverse connecting members 104 of the chain to come into engagement with at least one of the free ends of the lever arms 84, thereby preventing relative movement of the chain with respect to the chain engaging mechanism. This prevention of relative movement results in the transmission of drive force from the chain 100 to the chain engaging mechanism 60. Movement of the chain in the direction of the arrow marked "B" in FIG. 8 will cause the outboard extensions of the ends 106 of the transverse connecting members 104 of the chain to come into engagement with the free ends of the lever arms 84 which will pivot back into the recesses 80 to form a flush surface with the side walls, 70 and 72, thereby allowing the chain to slide through the groove 68. This allows for a "free-wheel" mechanism, whereby the necessity for providing such a mechanism in the hub or the wheel hub is eliminated.

Figure 9:
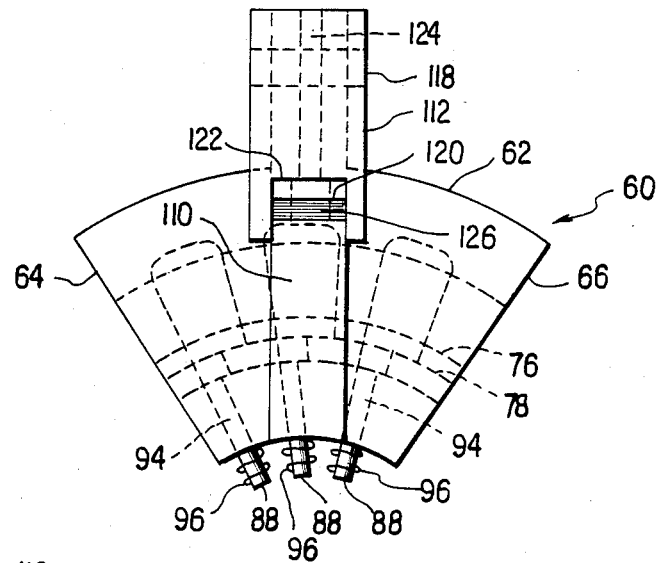
FIG. 9 is a back view of the preferred chain engaging mechanism according to the present invention.
Figure 10:
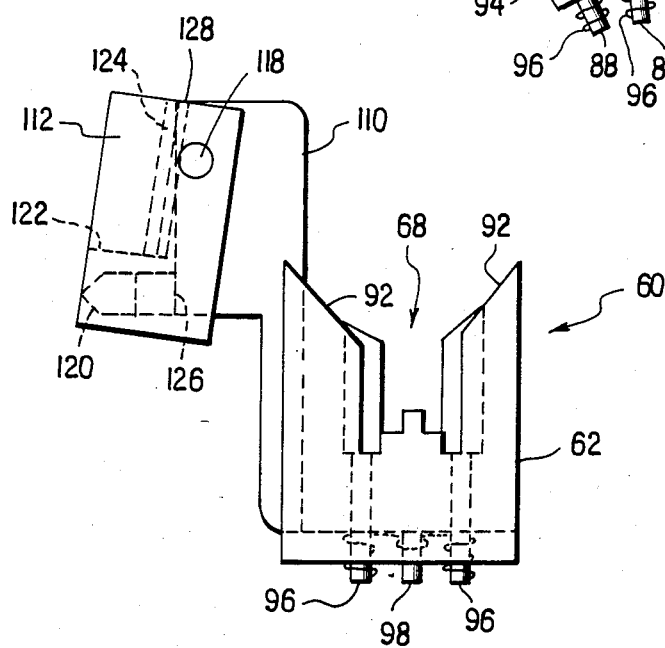
FIG. 10 is a side view of the preferred chain engaging mechanism according to the present invention.
Figure 15:
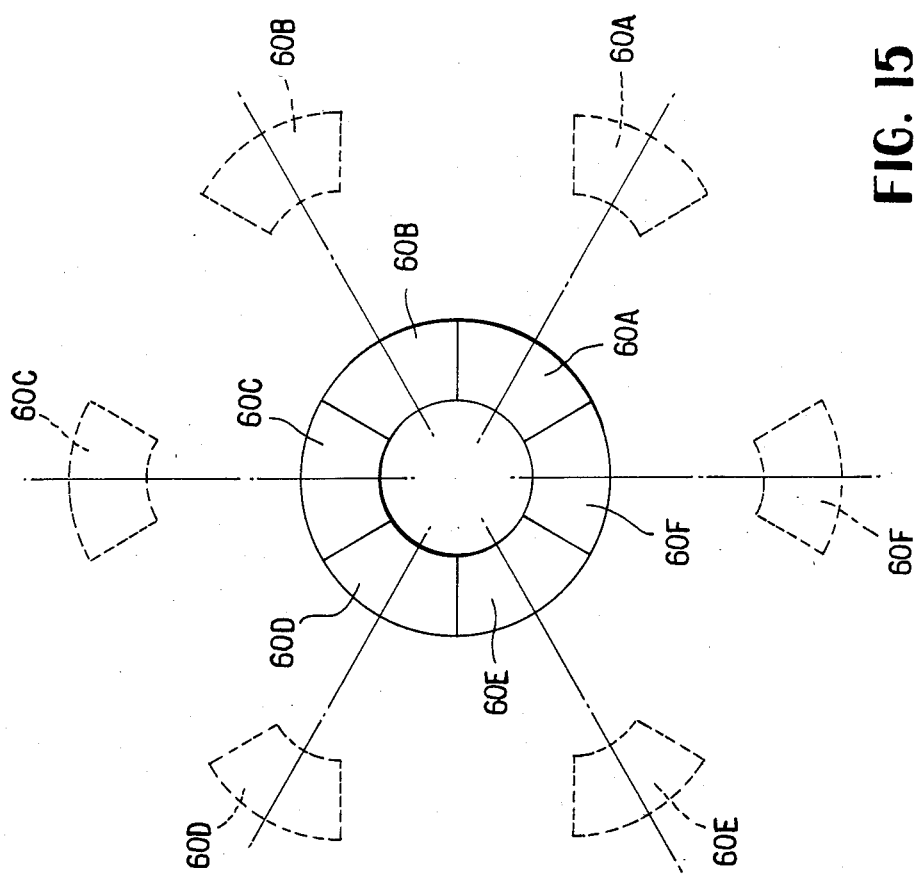
FIG. 15 illustrates the sprocket diameter variation according to the present invention.

As may best be seen in FIG. 9, the engagement body 62 is formed (in plan) as a sector of an annulus. As shown in FIG. 15, this permits the engagement bodies to come into contact with one another at the minimum diameter of the variable sprocket, whereas at diameters greater than the minimum diamter (as shown in dotted lines) the engagement bodies will have moved radially outward and be circumferentially displaced from one another. FIG. 15 shows the use of six engagement bodies, 60A, 60B, 60C, 60D, 60E and 60F, however, a greater or lesser number can be used to form the variable diameter sprocket. In a preferred embodiment only a portion, e.g., one half of the plurality of engagement bodies are fitted with levers 82 and associated recesses 80; while the remainder of the plurality of engagement bodies are formed with smooth side walls, 70 and 72, in the groove. With an even number of engagement bodies, the members with and without levers and associated recesses can be alternated with one another. Thus, in the configuration shown in FIG. 15, engagement bodies 60A, 60C and 60E would be provided with levers and associated recesses, whereas, engagement bodies 60B, 60D and 60F would not be so fitted. However, there is no requirement that an even or odd number of engagement bodies be utilized to define the variable diameter sprocket. Nor is there any requirement as to the portion of the engagement bodies which are fitted with levers and associated recesses. The sole requirement is that, at any given time during operation, at least one engagement body fitted with levers and associated recesses is in engagement with the drive chain.

The preferred chain engaging mechanism 60 is also preferably utilized with a preferred plug and following arm configuration. As shown in FIGS. 8-11, a following arm 110 connects the engagement body 62 to a plug 112 of rectangular cross-section. The plug 112 is pivotally connected to the following arm 110 by provision of corresponding apertures 114 and 116 in the plug and following arm, respectively, which receive a pin 118. The pin is retained in position by being force fit into the aperture 114 through plug 112, while the following arm may rotate about the pin. The following arm 110 is spring-elastically biased (by means not shown) away from the plug 112 so that a tooth 120 extending from the following arm 110 is shielded within a recess 122 formed in plug 112. A bore 124 passes through plug 112. A corresponding bore 126 through the tooth 120 is of larger internal diameter than that of the bore 124 through plug 112 to ensure open communication between both of the bores regardless of the angular position of the plug 112 with respect to the following arm 110. The bores 124 and 126 receive the flexible cable (not shown) which connects the plug to the centrifugal force generating means, previously discussed. The cable passes upwardly through the bore 126 in the tooth 120 and thence through the bore 124 in the plug 112. The cable is prevented from being pulled through the bores by provision of a button or knot on the end of the cable projecting through the top surface of the plug 112. The angular position of the following arm 110 with respect to the plug 112 is limited by the upper edge 128 of the recess 122 formed in the plug 112 which comes into contact with the following arm after a predetermined angular displacement.

The preferred plug and following arm configuration can be utilized with a hollow member as illustrated in FIGS. 18A, 18B and 18C. The hollow member, generally indicated at 130, is of rectangular cross-section as best seen in FIG. 18C, having a back wall 132, a front wall 134, a bottom 135, and two side walls 136-136 defining a central hollow 138 of substantially rectangular cross-section. The back wall 132 is thicker at its base than at its top having a step transition 140 between the different thicknesses, thereby forming a groove 141 over substantially the entire length of the back wall 132. A plate 142 having serrations 143 if force fitted (secured by screws or bolts not shown) into the groove 141, the serrations 143 facing into the central hollow 138. The serrations 143 are centrally located on the plate 142 with adjacent smooth portions 144-144 on either side of the serrations 143. The front wall 134 has a slot 146 over substantially its entire length. This slot 146 is as wide as the serrated portion 134 of the plate 142 and wide enough to slidingly receive the following arm 110 of the preferred chain engaging mechanism 60 (see FIGS. 8-11). The plug 112 of the preferred chain engaging mechanism 60 is adapted to slide within the central hollow 138 with the following arm 110 extending through the slot 146. When the chain engaging mechanism comes into contact with the drive chain, the pressure of the chain will cause the following arm 110 to rotate about pin 118, with respect to plug 112, and force tooth 120 out of recess 122 (as best seen in FIGS. 8 and 11) and into engagement with serrations 143. This locks plug 112 into place. When the chain disengages from the chain engaging mechanism, thereby relieving the pressure on the chain engaging mechanism, the following arm 110 will be free to rotate about pin 118, with respect to the plug 117, under the influence of the aforementioned bias, thereby retracting tooth 120 into the recess 122. This will once again allow the plug 112 to slide freely within the central hollow 138, thereby allowing readjustment of the sprocket diameter.

As with the guide members described in FIGS. 1A and 1B, legs 148-148 are provided at the base of the guide member 130, these legs fitting into corresponding sockets in a hub (not shown), the sockets being displaced circumferentially around the periphery of the hub. Bore 150 is provided in the base of hollow member 130 to allow a flexible cable (not shown) to be passed from the plug within the central hollow 138 over a pulley 152 mounted on an anxle 154 between legs 148-148 to a respective weight mounted on a spoke of the wheel.

Figure 14B:
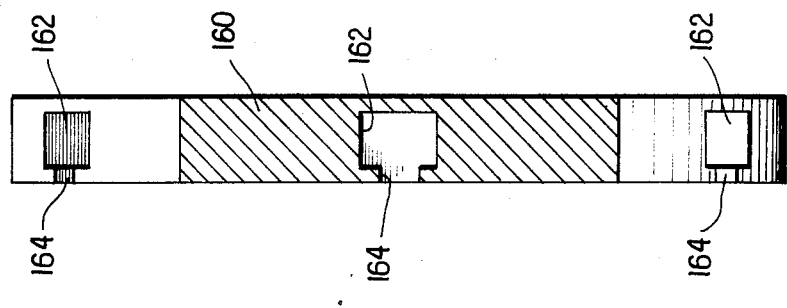
FIGS. 14A and 14B are views of a sprocket support disc according to the present invention, FIG. 14B being a section taken along line BB of FIG. 14A.
Figure 14A:
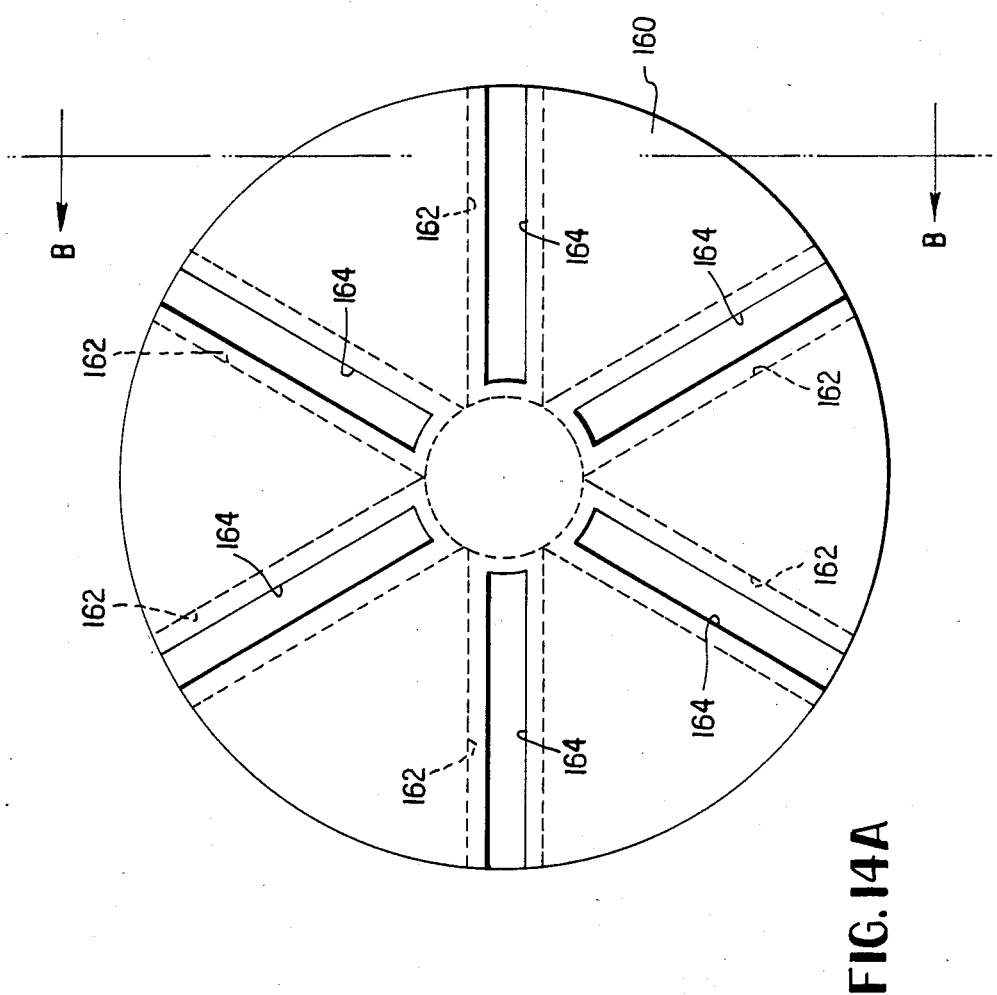

In an alternative embodiment, as shown in FIGS. 14A and 14B, the guide members may be formed integrally with the hub and/or with each other. As shown in FIG. 14A, a single casting in the form of a disc 160 can be provided with a plurality of hollow bores 162, of rectangular cross-section, extending radially from the center of the disc. Each bore being provided with a slot 164 extending over substantially the entire length of the hollow bore 162. In a like manner, fittings for cable passage can be provided as well as plates with serrations. Additionally, the disc could be formed as two castings, one fitted with grooves or channels, the other fitted with corresponding grooves and channels provided with slots, the two castings being held together by screws or bolts.

An alternative (but not preferred) chain engaging mechanism, generally indicated at 170, is illustrated in FIG. 17. The chain engaging mechanism comprises two teeth 172 and 174 pivoted about a common pivot pin 176. This pivot pin 176 is fixed at one end to a following arm 178, which in turn is attached to a plug 180. The two teeth 172 and 174 are spring biased to form a groove 182 therebetween, which is canted at an angle to the following arm of between 10° and 20°. This canting of the groove facilitates engagement of a rivet if a bicycle chain by the groove 182. Moreover, upon application of drive pressure by engagement with said chain rivet, said teeth are releasably locked into position with respect to said common pivot pin 176 by a locking means (not shown).

Figure 16:
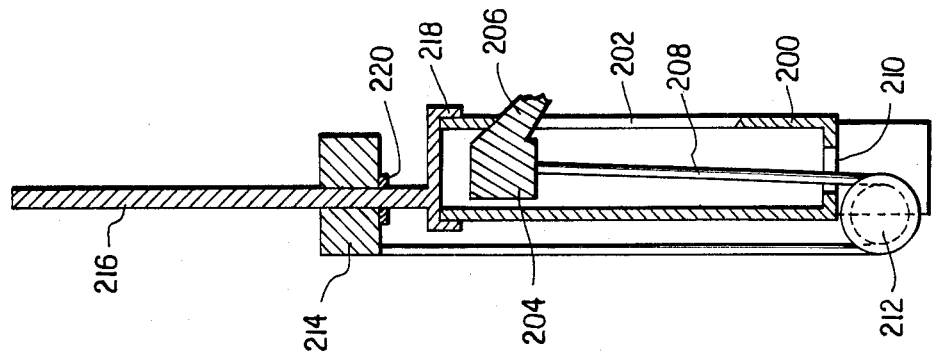
FIG. 16 illustrates a modification of the guide member according to the present invention.

FIG. 16 illustrates an alternate embodiment wherein an spoked wheel is not necessary for the operation of the invention. In this embodiment, a guide member 200, having a slot 202 formed over substantially its entire length, contains a plug 204, slideable therein, attached to a following arm 206. The following arm 206 at its free end is attached to a chain engaging mechanism (not shown), as previously described. Additionally, the plug 204, following arm 206 and hollow member 200 can be provided with a locking mechanism (not shown), as previously described, for releasably locking the plug 204 into position upon engagement of the chain engaging mechanism with a drive chain. A flexible cable 208 connected to the plug 204 passes through a hollow member 200, over a pulley 212, and is attached to a weight 214. A spring or springs (not shown) can be provided about the portion of the cable 208 within the hollow member 200 to yieldably urge the plug 204 away from the base of the hollow member 200, as previously described. The weight 214 slideably engages an elongated strut 216 extending from a cap 218 attached to the top of hollow member 200, the strut 216 being aligned parallel to the hollow member 200. A detent 220 may be fixed on strut 216 to limit the movement of weight 214 toward the hollow member 200, so that the cable 208 does not become slack when plug 204 is in its uppermost position in hollow member 200. As is apparent from this embodiment, the present invention is not limited to use with a conventional spoked bicycle wheel. The weights disclosed as an embodiment of the centrifugal force generating means may be disposed slideably on the spokes of a conventional bicycle wheel, on spokes or struts specifically provided on a solid wheel for such slideable engagement, or on spokes or struts provided on the transmission for such slideable engagement. As previously noted, when such weights are disposed on the wheel, the "free wheel" mechanism must be provided in the chain engaging mechanism so that relative rotation between the wheel and the transmission does not occur, such relative rotation leading to the flexible cables wrapping around the axle joining the wheel and the transmission.

What is claimed is:

1. An automatic transmission for a linked chain-driven wheel having an axis of rotation where the ratio of the linear speed of the chain to the angular speed of the wheel about the axis of rotation is automatically and substantially continuously adjusted, comprising:

(1) a plurality of engaging means circumferentially disposed about the axis of rotation, and, together, defining a sprocket of variable diameter for receivably engaging said linked chain, a portion of said plurality of engaging means engaged by said linked chain and at least one of said plurality of engaging means free of engagement with said linked chain;

(2) sprocket varying means, operably connected to said engaging means, for varying the radial position of said engaging means, and hence, the diameter of said sprocket, in relation to the angular speed of said wheel; said sprocket varying means rotatable about an axis in common with said axis of rotation of said wheel;

(3) connecting means for operably connecting the said sprocket varying means to said wheel;

(4) releasable locking means for automatically locking in a radial position the engaging means of the said sprocket which are being engaged by said chain and automatically unlocking said at least one engaging means of the said sprocket which is not being engaged by said chain;

whereby on angular rotation of said wheel those engaging means engaged by said chain are locked into a drive position for transmission of power to said wheel and said at least one engaging means not engaged by said chain is free to be radially moved by said sprocket varying means to automatically and substantially continuously establish a different sprocket diameter in relation to the angular speed of said wheel.

2. The automatic transmission of claim 1, wherein said sprocket varying means varies the sprocket diameter in response to centrifugal force generated by a centrifugal force generating means, in response to the angular speed of said wheel.

3. The automatic transmission of claim 2, wherein the centrifugal force generating means comprises at least one radially displaceable weight.

4. The automatic transmission of claim 2, wherein said sprocket varying means comprises a plurality of hollow guide members, each having an axis, connected to a hub, each member having an axially movable plug therein and each plug being operably connected to said centrifugal force generating means and a respective engaging means, the axes of said guide members being substantially transverse to the axis of rotation of said wheel.

5. The automatic transmission of claim 4, wherein there are a plurality of centrifugal force generating means and each centrifugal force generating means is operably connected to a respective plug.

6. The automatic transmission of claim 5, wherein each of said centrifugal force generating means is radially movable.

7. The automatic transmission of claim 6, further comprising at least one resistive force generating means for applying a force on said plug or on said centrifugal force generating means opposite to the centrifugal force generated by said centrifugal force generating means whereby the position of said plug in said hollow member, and hence the radial position of said engaging means, is determined by the relative amounts of force exerted by said centrifugal force generating means and said resistive force generating means.

8. The automatic transmission of claim 7, wherein said at least one resistive force generating means comprises at least one spring disposed to act on said plug or saod centrifugal force generating means.

9. The automatic transmission of claim 8, wherein as the centrifugal force increases by increased angular speed of said wheel, the centrifugal force generating means tends to move radially outwardly, the plug tends to move radially inwardly and hence the diameter of said sprocket decreases whereby the said ratio of the angular speed of the wheel to the linear speed of the chain automatically increases and vice-versa.

10. The automatic transmission of claim 9, wherein said wheel is a spoked wheel and the said centrifugal force generating means and the said respective plug are operably connected by a cable, each said centrifugal force generating means is a weight slidably disposed on a spoke of said spoked wheel and each said plug is connected to said respective engaging means by a rigid member.

11. The automatic transmission of claim 4, wherein each guide member has an axial slot therein and a following arm is pivotally mounted on each said plug and extends outwardly of the hollow member through said slot and is connected at its other end to said engaging means.

12. The automatic transmission as claimed in claim 1, wherein said connecting means comprises means for rigidly attaching said wheel to a shaft and means for rigidly attaching said sprocket varying means to said shaft; and wherein said engaging means includes means for lockingly engaging said chain when said chain is driven in a predetermined direction and slidingly engaging said chain when said chain is driven in the opposite direction.

13. The automatic transmission as claimed in claim 4, wherein said wheel is a spoked wheel and said centrifugal force generating means comprises a plurality of weights each of which is slidably mounted on a respective spoke of said wheel, each weight being connected by a flexible cable to a respective axially movable plug, and each cable passing through means for slidably passing said cable from said plug to said weight through the bottom of the guide member.

14. The automatic transmission as claimed in claim 13, wherein a biasing means is located within said guide member for urging said plug away from the bottom of the guide member.

15. The automatic transmission as claimed in claim 14, wherein said biasing means comprises a first spring of predetermined length located between said plug and said bottom of the guide member.

16. The automatic transmission as claimed in claim 15, wherein a second spring having a length less than said first spring is located within said guide member between said plug and said bottom of the guide member.

17. The automatic transmission as claimed in claim 11, wherein said plug includes a biasing means for yieldably holding said following arm at a predetermined angle to said guide member, whereby upon application of drive pressure to said engaging means by engagement with said chain said following arm will pivot toward said hollow member and upon release of drive pressure, by disengagement from said chain, said following arm will resume its position at a predetermined angle to said hollow member.

18. The automatic transmission as claimed in claim 17, wherein said locking means comprises a serrated surface axially disposed on the inner surface of said guide member and a tooth, engageable with said serrated surface, extending from said following arm toward said serrated surface, whereby upon application of drive pressure to said engaging means by engagement with said chain and hence pivotal motion of said following arm toward said guide member, said tooth will engage said serrated surface and prevent movement of said plug, and upon release of drive pressure by disengagement from said chain and hence pivotal motion of said following arm away from said guide member, said tooth will move free of said serrated surface and allow movement of said plug.

19. The automatic transmission as claimed in claim 1, wherein said linked chain comprises a plurality of link member pairs extending longitudinally and pivotally joined to adjacent link member pairs by transverse rod-like connecting members, each member of said link member pair being transversely spaced from the other member of said pair by a roller bearing rotatably fitted about said rod-like transverse member, said rod-like transverse member extending outboard of each member of said link member pairs.

20. The automatic transmission as claimed in claim 19, wherein each of said plurality of engaging means comprises an engagement body having a first end and a second end and a groove therein extending from said first end to said second end, said groove being receivable of said linked chain and having side walls and a bottom of predetermined profile.

21. The automatic transmission as claimed in claim 20, wherein at least a portion of said plurality of engaging means have at least one recess formed in each side wall of said groove; said at least one recess flushly receiving, with respect to said side wall, a lever having ends, said lever pivotally connected to said engagement body at the end of the lever closest to said first end of said engagement body; biasing means for yieldably urging the free end of said lever away from said side wall into said groove, said free end of said lever being engageable with said outboard extension of the transverse members of said linked chain.

22. The automatic transmission as claimed in claim 21, wherein a plurality of recesses and associated levers are provided in each side wall and the recesses and associated levers of one side wall are staggered in relation to the recesses and associated levers of the other side wall.

23. The automatic transmission as claimed in claim 20, wherein said bottom profile is a symmetrical profile across the width of the groove comprising a central raised portion extending from one end of the engagement body to the other end of the engagement body, said central raised portion comprising a center portion and shoulders adjacent each side of said center portion.

24. An automatic transmission for a bicycle, having at least one spoked wheel driven by a bicycle drive chain, said automatic transmission comprising:

a hub body comprising a hub, having an axis of rotation, and a plurality of guide members extending radially about said hub, said hub being coaxially connectable to a spoked bicycle wheel, having an axis of rotation, each guide member provided with a slot over substantially its entire length on the side opposite said spoked bicycle wheel;

a plurality of plugs, each of said plurality of plugs slidably disposed within a respective guide member;

a respective following arm mounted on each plug and extending outwardly and toward the axis of said hub through the slot provided in the guide member;

respective engaging means, mounted on the free end of said following arm, for drivingly engaging a bicycle drive chain;

a weight for each plug, respectively, said weight being slidably mountable on a respective spoke of said bicycle wheel;

flexible connecting means for connecting each weight to its respective plug;

means for slidably passing said flexible connecting means from said plug to its respective weight through said hub;

biasing means for yieldably urging said plug radially outward from said hub axis; and means for automatically locking each plug in place when pressure is applied to its respective engaging means by engagement with said bicycle drive chain and automatically unlocking each plug when said pressure is removed by disengagement of said respective engaging means from said bicycle drive chain.

25. The automatic transmission as claimed in claim 24, wherein said hub and said guide members are integrally formed with one another.

26. The automatic transmission as claimed in claim 25, wherein said hub body comprises a circular disc provided with a plurality of radially disposed internal bores slidingly receivable of a respective plug.

27. The automatic transmission as claimed in claim 24, further comprising detent means, mountable on the spokes of said bicycle wheel, for preventing said weights from sliding along a predetermined portion of said spokes.

28. In a bicycle comprising a supporting frame, a front ground engaging wheel rotatably mounted on an axle which is mounted on said supporting frame, a rear ground engaging wheel drivingly mounted on a first shaft which is journally mounted on said supporting frame, a transmission means for applying rotational force to said rear ground engaging wheel, a second shaft journally mounted on said supporting frame at substantially the fore and aft center of the frame between said front and rear wheels, foot driven pedals mounted on opposite ends of said second shaft, a drive sprocket fixedly mounted on said second shaft, said drive sprocket located adjacent said frame and inwardly of said pedal on that end of said second shaft, an endless chain loop engaging said drive sprocket and cooperating with said transmission means to transmit force on said pedals to said rear ground engaging wheel as rotational force, wherein said transmission means comprises:

(1) a plurality of engaging means displaced about said first shaft and, together, defining a sprocket of variable diameter for receivably engaging said endless chain loop whereby, in operation at any given time, a portion of said plurality of engaging means are engaged by said chain and at least one of said plurality of engaging means are free of engagement with said linked chain;

(2) sprocket varying means, operably connected to said engaging means, for varying the radial position of said engaging means, and hence, the diameter of said sprocket in relation to the angular speed of said wheel;

(3) connecting means for operably connecting the said sprocket varying means to said rear ground engaging wheel;

(4) releasable locking means for automatically locking in a radial position the engaging means of the said variable diameter sprocket which are being engaged by said endless chain loop and automatically unlocking said at least one engaging means of the said variable diameter sprocket which is not being engaged by said endless chain loop;

whereby on angular rotation of said wheel those engaging means engaged by said chain are locked into a drive position for transmission of power to said wheel and those engaging means not engaged by said chain are free to be radially moved by said sprocket varying means to automatically and substantially continuously establish a different sprocket diameter in relation to the angular speed of said wheel.

29. In combination a spoked bicycle wheel, having an axis of rotation, and a transmission means, having an axis, for engaging a drive chain and applying rotational force to said wheel, said transmission means coaxially connected to said wheel, wherein said transmission means comprises:

(1) a plurality of engaging means circumferentially spaced about said axis of rotation and, together, defining a sprocket of variable diameter receivably engageable of said drive chain, whereby, in operation at any given time, a portion of said plurality of engaging means are engaged by said drive chain and at least one of said plurality of engaging means are free of engagement with said drive chain;

(2) sprocket varying means, operably connected to said engaging means, for varying the radial position of said engaging means, and hence, the diameter of said sprocket in relation to the angular speed of said wheel; and (3) releasable locking means for automatically locking in a radial position the engaging means of the said variable diameter sprocket which are being engaged by said drive chain and automatically unlocking said at least one engaging means of said variable diameter sprocket which are not being engaged by said drive chain;

whereby on angular rotation of said wheel those engaging means engaged by said chain are locked into a drive position for transmission of power to said wheel and those engaging means not engaged by said chain are free to be radially moved by said sprocket varying means to automatically and substantially continuously establish a different sprocket diameter in relation to the angular speed of said wheel.

30. A kit for retro-fitting a bicycle, having a multi-speed transmission on the rear wheel thereof, with an automatic transmission, the kit comprising:

(A) a linked drive chain, formed of an endless loop, comprising a plurality of link member pairs extending longitudinally and pivotally joined to adjacent link member pairs by transverse rod-like connecting members, each member of said link member pair being transversely spaced from the other member of said pair by a roller bearing rotatably fitted about said rod-like transverse member, said rod-like transverse members extending outboard of said link member pairs; and (B) a transmission means comprising:

(1) a plurality of engaging means circumferentially spaced about an imaginary axis and, together, defining a sprocket of variable diameter for receivably engaging said endless chain loop, whereby, in operation at any given time, a portion of said plurality of engaging means are engaged by said chain and at least one of said plurality of engaging means are free of engagement with said chain, and at least a portion of said plurality of engaging means include means for lockingly engaging said outboard extensions of said transverse members of said chain when said chain is driven in a predetermined direction and slidingly engaging said outboard extensions of said transverse members of said chain when said chain is driven in the opposite direction;

(2) sprocket varying means, operably connected to said engaging means, for varying the radial position of said engaging means, and hence, the diameter of said sprocket in relation to the angular speed of said wheel;

(3) connecting means for operably connecting the said sprocket varying means to said bicycle wheel; and (4) releasable locking means for automatically locking in a radial position the engaging means of the said sprocket which are being engaged by said chain and automatically unlocking said at least one engaging means of the said sprocket which are not being engaged by said endless chain loop;

whereby on angular rotation of said wheel those engaging means engaged by said chain are locked into a drive position for transmission of power to said wheel and those engaging means not engaged by said chain are free to be radially moved by said sprocket varying means to automatically and substantially continuously establish a different sprocket diameter in relation to the angular speed of said wheel.

* * * * *